Patented May 23, 1933

1,911,092

UNITED STATES PATENT OFFICE

WINFIELD SCOTT, OF AKRON, OHIO, ASSIGNOR TO THE RUBBER SERVICE LABORATORIES COMPANY, OF AKRON, OHIO, A CORPORATION OF OHIO

MANUFACTURE OF AGE-RESISTANT VULCANIZED RUBBER COMPOUND

No Drawing.   Application filed December 20, 1926.   Serial No. 156,064.

My present invention is directed to a process of manufacturing a vulcanized rubber product by employing in the vulcanization step, as an adjuvant to the accelerator of that process, a new type of a compound that imparts to the cured product valuable and characteristic age-resistant qualities.

It has recently been discovered that certain compounds such as the aldol reaction product of alpha-naphthylamine or the acetaldehyde derivative of analine hydrochloride, when added to a rubber mix containing rubber, sulphur, compounding ingredients and an accelerator, and the mix vulcanized, produce a cured product that is more resistant to oxidation and stands up better in service than the rubber products manufactured without employing such materials. These materials are commonly termed anti-oxidants or age-resisting compounds. Such compounds, however, usually are relatively poor accelerators of the vulcanization process and when employed, are used in addition to and not in place of the accelerator.

In an earlier application, Serial No. 751,200, filed November 20, 1924, I have shown that the reaction products of the hydroxy-benzenes with amino compounds, for example the reaction product of hydroquinone with piperidine, not only accelerated the vulcanization process but also imparted age-resistant properties to the vulcanized rubber product. In other words, such substances possess the dual properties of shortening the time ordinarily required for producing a commercial vulcanized product and also of yielding a product that has characteristic age-resisting qualities, that is, the substances are both accelerators and anti-oxidants.

I have now found another derivative of the hydroxy-benzenes that imparts valuable age-resisting properties to a rubber mix when employed therein. One example of such a compound is the reaction product of hydroquinone with hydrazo-benzene. This product is readily manufactured by dissolving approximately 110 parts by weight (one molecular proportion) of hydroquinone and substantially 184 parts by weight (one molecular proportion) by hydrazo-benzene in a common solvent for the materials such as ether, allowing the solution to stand with occasional stirring for a short time, for example about an hour, and then removing the solvent in any desirable manner to obtain a dry product. In preparing the solutions, the ingredients may be dissolved separately and the solutions mixed, or the ingredients may be added together to the necessary quantity of solvent, as desired. The product is a solid melting at from 115° to 117° centigrade.

The reaction product of hydroquinone and hydrazo-benzene may be obtained in a similar manner by employing other proportions of the ingredients than those mentioned in the example hereinbefore given. Thus, one molecular proportion (110 parts by weight) of hydroquinone and two molecular proportions (368 parts by weight) of hydrazo-benzene may be dissolved in a solvent such as ether, the solution allowed to stand as before and the solvent removed in any desirable manner, for example by vacuum distillation. The resulting product is then ready for incorporation into a rubber mix. Other hydroxy derivatives of benzene, such as the dihydroxy derivatives, that is pyrocatechol, resorcinol and the mono- and tri-hydroxy derivatives such as phenol, pyrogallol and their homologues and substituted hydroxy derivatives may be employed in place of hydroquinone as set forth in the example. The hydrazo-benzene mentioned in the examples may likewise be replaced by employing in place thereof, similar molecular proportions of other aromatic hydrazine compounds and preferably the symmetrical hydrazotoluenes and hydrazoxylenes.

The age resisting qualities of the reaction products of hydroxy benzenes with aromatic hydrazines hereinbefore mentioned may be readily ascertained by manufacturing a rubber composition serving as a control stock and then adding varying proportions of the age resisting compounds to successive and different portions of a like rubber compounds. These rubber compounds are then vulcanized in the usual manner and the various vulcanized samples are subjected to tests to determine their physical characteristics before aging. The various rubber compositions mentioned are prepared in sufficient quantity so that duplicate test sheets of the compounds are vulcanized, one of which is tested before aging while another is subjected to an artificial aging operation, and then tested. A comparison of the physical characteristics of the various vulcanized test samples obtained before and after the artificial aging tests had been carried out, illustrate the remarkable effect of the various anti-oxidants in a rubber composition.

The Bierer-Davis artificial aging test was devised to ascertain the effect of oxidation upon rubber compounds. Vulcanized rubber articles stored under natural conditions deteriorate in quality and this deterioration is caused to a great extent by oxidation of the rubber. It has been found from extensive investigation that the deterioration suffered by vulcanized rubber when heated for about ten hours at 60° C. in a bomb under 300 pounds per square inch pressure of oxygen is approximately of the same degree and character as one year of natural aging. It is known in an empirical way that an increase in temperature of 10° C. will at least double the rate of a reaction. The test samples hereinafter described, being heated for four hours at 90° C. in a bomb under the pressure of 500 pounds of oxygen per square inch were therefore subjected to such severe artificial treatment as would closely approximate the natural aging resulting from about three years storage in the dark.

As a control stock there was employed a composition comprising 100 parts of rubber, such as pale crepe rubber, 5 parts of zinc oxide, 2.25 parts of sulphur and one part of an accelerator such, for example, as diphenyl-guanidine. To different portions of a similar stock there were added the compounds imparting age resisting properties and the rubber compositions were then vulcanized in the usual manner for a period of time sufficient to produce a vulcanized product. The properties of the unaged products are shown in the following table:

*Table 1*

Aged 0 hours

| Anti-oxidant | Per cent anti-oxidant employed | Time of cure at 40# steam pressure per sq/in. | Tensile strength in lbs/in.$^2$ at 700% elongation | Break | Ultimate elongation |
|---|---|---|---|---|---|
| | | Minutes | | | Per cent |
| Control | 0 | 35 | 1580 | 2825 | 810 |
| Control | 0 | 45 | 2015 | 3295 | 795 |
| Hydrazo-benzene | 5 | 35 | 1795 | 3633 | 840 |
| Hydrazo-benzene | 5 | 45 | 1960 | 3460 | 820 |
| Benzidine | 5 | 35 | 2810 | 3675 | 760 |
| Benzidine | 5 | 45 | 2865 | 3335 | 755 |
| Hydro-quinone | 5 | 35 | 863 | 1155 | 790 |
| Hydro-quinone | 5 | 45 | 810 | 1780 | 885 |
| 1 mol. hydrazo-benzene plus 1 mol. hydro-quinone | 1 | 35 | 1070 | 2585 | 870 |
| | 1 | 45 | 1330 | 2715 | 830 |
| | 3 | 35 | 886 | 2248 | 870 |
| | 3 | 45 | 1098 | 2603 | 855 |
| 2 mol. hydrazo-benzene plus 1 mol. hydro-quinone | 1 | 35 | 1350 | 2730 | 840 |
| | 1 | 45 | 1735 | 3140 | 840 |
| | 3 | 35 | 1170 | 2463 | 840 |
| | 3 | 45 | 1378 | 2920 | 850 |

It is apparent from the above table that hydroquinone when employed in a rubber mix affects the vulcanized product so as to impair its properties most seriously. Hydrazo-benzene and benzidine, on the other hand, yield a product that possesses a tensile strength appreciably higher and fully vulcanized at a shorter time than the control stock.

Duplicate vulcanized samples of the various rubber compounds listed in the table above were then subjected to the artificial aging test hereinbefore described and the aged samples were then tested and found to give the following results:

*Table 2*

Aged 4 hours at 90° C. under 500 lbs. oxygen

| Anti-oxidant | Per cent of anti-oxidant | Time of cure at 40# steam pressure per sq/in. | Tensile strength in lbs/in.$^2$ at 700% elongation | Break | Ultimate elongation |
|---|---|---|---|---|---|
| | | Minutes | | | Per cent |
| Control | 0 | 35 | 1010 | 1600 | 740 |
| Control | 0 | 45 | 1430 | 1858 | 750 |
| Hydrazo-benzene | 5 | 35 | 1795 | 2710 | 800 |
| Hydrazo-benzene | 5 | 45 | 2150 | 2600 | 760 |
| Benzidine | 5 | 35 | | 2633 | 695 |
| Benzidine | 5 | 45 | | 2290 | 655 |
| Hydroquinone | 5 | 35 | 937 | 1213 | 750 |
| Hydroquinone | 5 | 45 | 1103 | 1355 | 760 |
| Hydrazo-benzine (1 mol.) plus hydroquinone (1 mol.) | 1 | 35 | 1390 | 2108 | 780 |
| | 1 | 45 | 1705 | 2083 | 735 |
| | 3 | 35 | 1465 | 1520 | 710 |
| | 3 | 45 | 1615 | 2078 | 750 |
| Hydrazo-benzene (2 mols.) plus hydroquinone (1 mol.) | 1 | 35 | 1655 | 2950 | 830 |
| | 1 | 45 | 1923 | 3145 | 795 |
| | 3 | 35 | 1495 | 3030 | 840 |
| | 3 | 45 | 1715 | 2670 | 795 |

It is seen that the control stock containing none of the anti-oxidant is very seriously affected by this test. The stock containing hydrazo-benzene and also the sample containing benzidine and the one containing hydroquinone have withstood this severe test much better. The stocks containing the reaction product of hydroquinone and hydrazo-benzene have resisted the aging test most satisfactorily. In fact, the one containing the reaction product of one molecular proportion of hydroquinone with two molecular proportions of hydrazo-benzene has not only completely resisted deterioration but has retained characteristics substantially identical with the unaged control stock.

The aging test to which these various rubber stocks have been subjected is considered by technologists to have produced results comparable with and practically equivalent to the changes that take place in a rubber compound in from two to three years of natural wear. Some rubber articles, such as the inner tubes of tires, when used in large sized pneumatic tires on busses or trucks engaged on long trips have been found to deteriorate rapidly due to the terrific heat generated in the flexing of the tire and from the brake drums, and such compounds have been found to be greatly improved by employing an age resisting compound in the manufacture of the stock. Other rubber articles as well have their life considerably lengthened by employing in their composition from one to 5% of the anti-oxidant materials disclosed herein.

It is to be understood that the present invention is not limited to the examples set forth which are merely illustrative. Other rubber compounds containing various proportions of different compounding ingredients and different accelerators than the one mentioned, are apparent to and may be readily employed by one skilled in the art to which this invention pertains. The particular compound employed merely depends upon the use to which the vulcanized product is intended. My invention is then to be considered as limited only by the claims attached hereto as a part of this specification wherein I intend to claim all novelty inherent in my invention as permissible in view of the prior art.

What I claim is:

1. The process of manufacturing an age resisting rubber composition which comprises heating a mixture of rubber and sulfur in the presence of a reaction product of an aromatic hydrocarbon wherein at least one but not more than three hydrogen atoms are substituted by hydroxyl groups, with an aromatic hydrazine.

2. The process of manufacturing an age resistant rubber composition which comprises heating a mixture of rubber, sulfur and a vulcanization accelerator in the presence of the reaction product of an aromatic hydrocarbon containing two substituents only, said substituents consisting of hydroxyl groups, with hydrazo-benzene.

3. The process of manufacturing an age resistant rubber composition which comprises heating a mixture of rubber, sulphur and a vulcanization accelerator in the presence of the reaction product of hydroquinone with hydrazo-benzene.

4. The process of manufacturing an age resistant rubber composition which comprises heating a mixture of rubber, sulphur and a vulcanization accelerator in the presence of the reaction product of one molecular proportion of hydroquinone with two molecular proportions of hydrazo-benzene.

5. An age resisting vulcanized rubber product resulting from heating together rubber, sulfur, a vulcanization accelerator and the reaction product of an aromatic hydrocarbon, wherein at least one but not more than three hydrogen atoms are substituted by hydroxyl groups, with an aromatic hydrazine.

6. An age resistant vulcanized rubber product resulting from heating together rubber, sulfur, a vulcanization accelerator and the reaction product of an aromatic hydrocarbon containing two substituents only, said substituents consisting of hydroxyl groups, with hydrazo-benzene.

7. An age resistant vulcanized rubber product resulting from heating together rubber, sulphur, a vulcanization accelerator and the reaction product of hydroquinone with hydrazo-benzene.

8. An age resistant vulcanized rubber product resulting from heating together rubber, sulphur, a vulcanization accelerator and the reaction product of substantially one molecular proportion of hydroquinone with two molecular proportions of hydrazo-benzene.

In testimony whereof I affix my signature.

WINFIELD SCOTT.